Sept. 1, 1964     ERNST-GÜNTER HAASE     3,146,973
MECHANISM FOR ACTUATING A MOVABLE FLIGHT CONTROL SURFACE
Filed Dec. 22, 1961
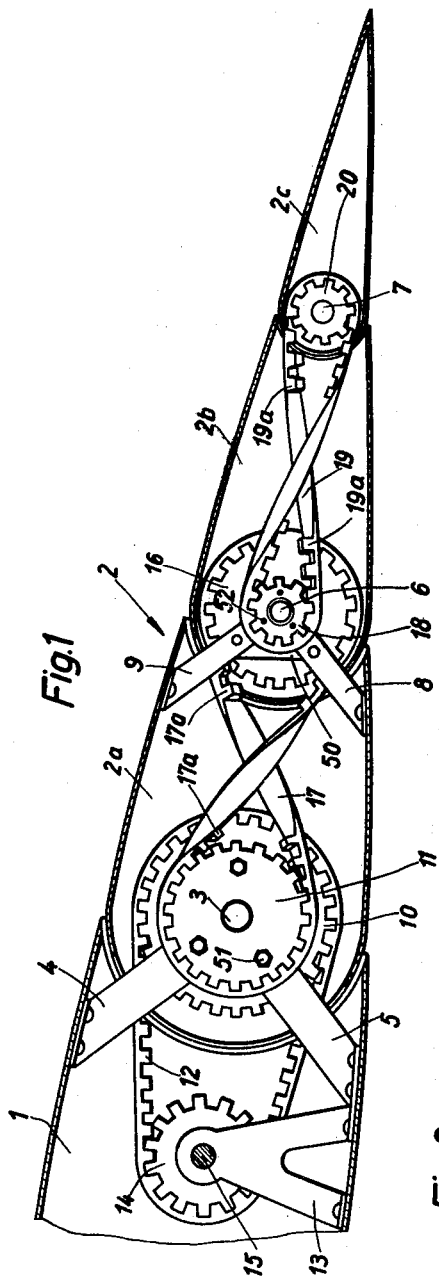
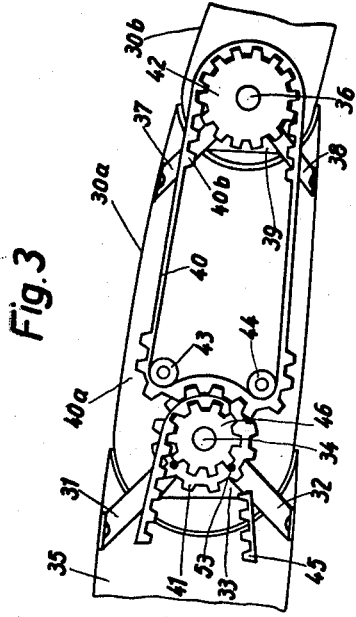
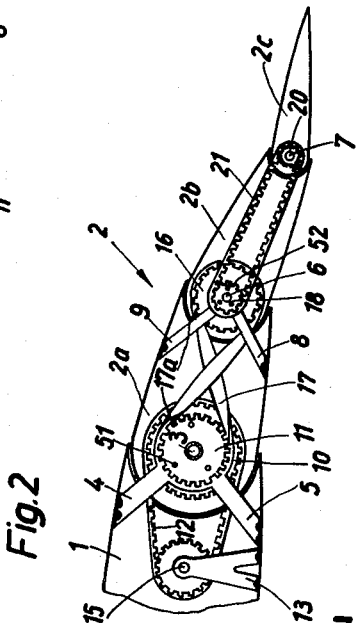
Inventor:
ERNST-GÜNTER HAASE
BY:
M. Glew and Toren
ATTORNEYS

United States Patent Office 3,146,973
Patented Sept. 1, 1964

3,146,973
MECHANISM FOR ACTUATING A MOVABLE
FLIGHT CONTROL SURFACE
Ernst-Günter Haase, Ottobrunn, near Munich, Germany,
assignor to Boikow-Entwicklungen Kommanditgesellschaft, Ottobrunn, near Munich, Germany
Filed Dec. 22, 1961, Ser. No. 161,645
Claims priority, application Germany Dec. 27, 1960
4 Claims. (Cl. 244—87)

This invention relates in general to control mechanisms for actuating movable control surfaces of an aircraft frame or flying body, and in particular to a new and useful operating mechanism for controlling movable portions of an aircraft wing or other control surface, which includes one or a plurality of movable portions pivotally mounted on a fixed air flow surface.

The present invention has particular application for the control of movement of a movable element in a flying body for the purpose of controlling or influencing the flight thereof. The invention has particular application in employment with a wing structure which, for the purpose of this application, is deemed to include any movable part or element which is provided on a body of an aircraft or similar flying body and whose position is changed for a desired purpose, such as for example, air foils, flaps, rudders, ailerons, elevators, tabs, etc.

It is well known to provide control mechanisms for operating movable elements of flight control surfaces which consist of rods, tackles, rope mechanisms, levers, etc. Such operating mechanisms, however, have the disadvantage that they operate with a great deal of play in their movement. Even with an insignificant play which is present in the connecting portions of such control mechanisms, it happens that there are movement ranges where relatively large angles of movement of the actuating control will produce very little, if any comparable movement of the surface to be actuated, due to the play between the connecting parts. These "dead" angles prevent accurate control of the position of the control surface during all periods of flight and in those instances where the control surface such as a wing has several movable parts, then the dead angles cause a fluttering of the individual wing portions. A further disadvantage in the known operating mechanisms is that they very often have actuating rods, ropes or connecting cables which are disposed on the outside of the frame structure in the air stream and present a resistance to the air flow which produces aerodynamically unfavorable conditions.

In accordance with the present invention, a play-free control mechanism is provided which includes an operating mechanism comprising a drive or transmission which includes an arrangement of gears and connecting geared belts. In a preferred embodiment, a movable surface is affixed to an axle which is rotatably supported at an end of a fixed wing or control surface portion. This movable surface is moved relatively to the wing by rotating a shaft carrying a gear which drives a similar gear affixed to the axle supporting the movable element by means of a gear belt. Movement of the driving gear is effective to provide similar movement of the driven gear supported on the movable element axle due to the provision of the toothed belt drive so that the movable element is displaced without any dead angles or play.

In a further embodiment of the invention, a plurality of movable control surfaces are arranged as a continuous extension of a fixed wing portion, the inner movable elements being displaceable by the gear and belt drive as mentioned above. The next outermost element is mounted on an axle which is rotatably supported at the end of the first movable element. Interconnecting gear and belt means are provided between the first and second movable elements to provide for either a corresponding rotatable movement of the second element in the same direction in respect to the first or an opposite rotatable movement of the second element in respect to the first. In one arrangement, the motion is effected by a gear belt drive having crossing belt elements, the arrangement being such that the pivotal movement of the second movable element is in the same direction of rotation as the first movable element about the fixed wing section.

In another embodiment of the invention, the gear belting is arranged in a straight manner to produce corresponding rotatable movement of each of the connecting movable elements.

In still another embodiment, external gearing is formed on the belt members to provide still another means of moving each of the adjacent movable elements in a corresponding manner.

In accordance with a feature of the invention, the operation of the movable elements of a control surface such as a wing is accomplished by means of a torsion shaft and the individual parts are moved by way of at least one reduction gear transmission. This step-down or reducing ratio from the control shaft to the gear belt or belts of the wing is chosen in such a manner that a relatively large angle of movement of the actuating shaft corresponds to a relatively small wing or movable element surface deflection. Such a construction is particularly suitable for multi-part wings in which the forces resisting actuation are very often considerable, and thus it is possible with the use of only a relatively small torque at the actuating shaft to produce a significant actuating force on the control surface. This also permits a very light weight actuating shaft to be employed without encountering unfavorable overloading by torsional stresses.

A further feature of the construction of the invention is the provision of gear belting which includes gear teeth which are arranged either internally or externally in respect to the belting. The gear belting is advantageously made free of gear teeth at their intermediate section between driven and driving gears so that they may cross to produce corresponding motion of the next adjacent element to that of the first element.

Accordingly, it is an object of this invention to provide an improved transmission mechanism for operating movable elements of a flight control surface.

A further object of the invention is to provide an improved control mechanism for moving elements in a composite air surface control member.

A further object of the invention is to provide an air control surface having a fixed portion and one or more movable elements, including a transmission for displacing the elements in respect to the fixed portion, which includes one or more gear and belt drives.

A further object of the invention is to provide a wing or similar flight control surface which includes a plurality of movable control surfaces connected thereto, including an inner control surface affixed to an axle which is rotatably supported at the end of a fixed control surface and which is rotated relative to the fixed control surface by the means of a gear affixed to the axle and driven by a belt drive operated from a gear carried in the fixed portion, and further including at least one additional movable element carried by an axle rotatably mounted at the end of the next inner adjacent movable element and rotatable by means of a gear affixed to the axle and driven by gear belting from a stationary gear mounted concentrically with the axle of the next inner adjacent movable element.

A further object of the invention is to provide a control mechanism for operating a movable element of a flight control surface such as a wing which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a fragmentary transverse section of an aircraft wing which includes a fixed wing element with a plurality of movable control flaps or elements articulated to the wing and movable in respect to the fixed element by means of gearing and belt connections constructed in accordance with the invention;

FIGURE 2 is a fragmentary transverse section similar to FIG. 1, but on a somewhat reduced scale and indicating another embodiment of the invention which includes gearing for displacing the outermost flap in an opposite direction to the adjacent connected flap; and FIG. 3 is a fragmentary transverse section on a reduced scale from that of FIG. 1 indicating still another embodiment of the invention.

Referring to the drawings in particular, the invention embodied therein includes a fixed aircraft wing structure 1 which is affixed to an aircraft frame or fuselage (not shown) and which has an opening at its outer end to accomodate a wing flap generally designated 2. In the embodiment indicated, the wing flap 2 consists of several individual movable flap elements or parts 2a, 2b and 2c. The innermost part 2a is rotatably mounted within the outer opening of the fixed wing 1. The part 2a is affixed to an axle or pin 3 which is rotatable in a bearing carried by supporting struts or carriers 4 and 5 affixed to the wing 1. The intermediate movable element 2b is rotatably mounted in respect to the innermost movable element 2a. The element 2b is affixed to an axle or pin 6 which is rotatable in bearings supported on struts 8 and 9, which are secured to the innermost movable element 2a. The outermost element 2b is affixed to an axle or pin 7 which is supported on similar struts (not shown) affixed to the intermediate element 2b.

In accordance with the invention, the actuation or drive of the flap portions 2a, 2b and 2c is accomplished by means of a gear and connecting belt transmission with one such arrangement being associated with each movable flap element or connecting flap pair. For this purpose, gear 10 is affixed to the axle 3 and it may be rotated to rotate the axle 3 by means of the gear belt 12 which is articulated by means of the gear 14 affixed to a control shaft 15 which is supported on the support or bearing block 13 on the wing 1. Suitable means are provided for operation by the pilot (not shown) to rotate the control shaft 15 and the control gear 14 for the purpose of displacing the flap 2a. When the gear 14 is rotated counterclockwise, this produces a counterclockwise rotation of the gear 10 and the axle 3, and the counterclockwise rotation of the control surface 2a in respect to the fixed wing 1. Opposite rotation of the gear 14 produces a corresponding opposite or clockwise rotation of the innermost flap 2a in respect to the wing 1.

In the embodiment indicated in FIG. 1, a gear 11 is freely fitted over the axle 3 and affixed to the supports 4 and 5 by means of bolts 51. A gear belt 17 having gear teeth 17a at spaced end locations is trained around the gear 11 and around a gear 16 which is affixed to the axle 6 of the intermediate flap portion 2b. Since the belt 17 is crossed between the gears 11 and 16 when the axle 3 and the innermost flap 2a are rotated counterclockwise or upwardly, a corresponding counterclockwise rotation of the gear 16 is produced due to the rotation of flap portion 2a and an upward rotative movement of the intermediate flap portion 2b ensues. Similarly, when the flap 2a is rotated in a clockwise direction, that is downwardly, the flap 2b will be rotated in a counterclockwise or downward direction correspondingly.

It should be noted that the gear 14 is a relatively small sized gear in comparison to the gear 10 and therefore a large angular movement thereof will only produce a relatively small angular movement of the gear 10 but the torque required on the control shaft 15 will be small in comparison to the actuating force produced on the axle 3.

A gear 18 is secured to the supporting struts 8 and 9 by means of bolts 52 and it is mounted concentric with the axle 6 but permits unhindered rotative movement of the axle 6 in respect thereto. The gear 18 is connected by belting 19 having gear teeth 19a as indicated with a gear 20 which is affixed to an axle 7 which carries the flap portion 2c. When the gear 16 is rotated to produce a rotative movement of the flap 2b, a corresponding rotative movement of the flap 2c will be produced by rotation of the gear 20 affixed to the axle 7 carrying the flap 2c. Belt 19 is crossed at the center thereof and at such area is made free of gear teeth 19a. The crossing of the belt at such area insures a rotative movement of the flap 2c in the same direction as the flap 2b.

In FIG. 2, another embodiment of the invention is indicated in which corresponding parts are similarly designated. The innermost flap 2a is mounted in the same manner as indicated in FIG. 1, however the intermediate flap 2b is connected to the outermost flap 2c by means of gear belting 21 which is not crossed, and hence gear 20 is rotated in an opposite direction to that of gear 16 upon rotation of the control shaft 15. In all other respects, the embodiment indicated in FIG. 2 is the same as FIG. 1, the only difference being the belt drive 21 between the gear 18 and the gear 20 to produce an opposite rotative movement of the flap 2c from that of the flaps 2b and 2a.

In FIG. 3, another embodiment is indicated in which a wing structure 35 includes supporting struts 31 and 32 provided to support a bearing block 33 which rotatably carries an axle or pin 34 upon which is affixed a gear 46. A movable flap portion 30a is secured to the bolt 34 for rotation therewith and rotation is effected through the gear toothed belt 45 connected to the gear 46. A gear 41 is secured to the struts 31 and 32 by means of bolts 53 and it is arranged in meshing engagement with external gear teeth 40a of a gear belt 40 which also includes internal gear teeth 40b which are in meshing engagement with a rotatable gear 42 which is secured to an axle 36 with which it rotates. A movable flap section 30b is affixed to the axle 36. Struts 37 and 38 rotatably hold the axle 36. Pulleys 43 and 44 are rotatably mounted on the flap section 30a and arranged at spaced locations in order to insure that the gear teeth 40a are guided through an arc in meshing engagement with the gear teeth on the gear 41. The external gear teeth 40a of the belt 40 in meshing engagement with the fixed gear 41 cause a rotative movement of the gear 42 via the internal gearing 40b in the same rotative sense as the gear 46 and axle 34 to produce a rotative movement of the flap 30b in the same rotative sense as the flap 30a.

Identical angular deflection is obtained in the embodiment of FIG. 1 between the flaps 2a and 2b by the employment of associated gears 11 and 16 with a corresponding number of teeth. The same deflection is also obtained between the flaps 2b and 2c by the provision of gears 18 and 20 having the same number of teeth. It should be appreciated, however, that the invention is not limited to this type of construction for the transmission mechanism. For example, if it is desired that the rotative angle should be larger in respect to the outermost flap 2c, then it is, of course, feasible instead of the gear 20, to arrange a gear which is smaller than the gear 18 and has a lesser number of teeth. However, if the angular deflection should be increased in respect to the outermost flap 2c, then instead of the smaller gear 20, a larger gear with a larger number of teeth is employed.

As the displacement forces become greater and the more flap portions are to be moved at the same time, there is provided in accordance with a further feature of the invention a difference in size or thickness of the gear belts which are employed. In FIG. 1, for example, the gear belt 19 is provided with a smaller width than the gear belt 17. In this embodiment, however, the varying width or thickness of the gear belts 12, 17 and 19 is not material, because the belts 12 and 17 run on respectively larger gears than the belt of the subsequent gear transmission and with larger belt gears, the momentum to be transmitted is also correspondingly larger.

It can be seen that in each of the embodiments the displacement members or transmission elements for the individual wing sections 2a, 2b and 2c are arranged in such a manner that no part of the transmission projects from the total wing configuration. It can also be seen that any number of flap elements may be arranged in nested fashion for separate articulation as indicated.

The invention provides means for deflecting the controlled flap displacement in either the same or in an opposite direction in accordance with the transmission element arrangement.

While specific embodiments of the invention have been shown and described in detail to illustrate the application of the inventive principles, it will be understood that the invention may be embodied otherwise without departing from such principles.

What is claimed is:

1. A transmission for the control of a flap in respect to a fixed air flow surface such as a wing, comprising an axle adapted to be rotatably supported at the end of said wing and carrying said flap, a gear secured to said axle, a control gear rotatably mounted on said wing, a gear belt connected between said control gear and said gear, a second axle rotatably carried at the end of said flap, a second flap connected to said second axle for rotation therewith, a second gear secured to said second axle, an axle gear concentric with and secured to said first axle, and a second gear belt connected between said axle gear and said second gear, said second gear belt having internal teeth and being crossed between said axle gear and said second gear, wherein said second flap is moved in the same direction as said first mentioned flap.

2. A transmission for the control of a flap in respect to a fixed air flow surface such as a wing, comprising an axle adapted to be rotatably supported at the end of said wing and carrying said flap, a gear secured to said axle, a control gear rotatably mounted on said wing, a gear belt connected between said control gear and said gear, a second axle rotatably carried at the end of said flap, a second flap connected to said axle for rotation therewith, a gear secured to said second axle, an axle gear concentric with and secured to said first axle, and a second gear belt connected between said axle gear and the gear of said second axle, said second gear belt having external gear teeth.

3. A transmission for the control of a flap in respect to a fixed air flow surface such as a wing, comprising an axle adapted to be rotatably supported at the end of said wing and carrying said flap, a gear secured to said axle, a control gear rotatably mounted on said wing, a gear belt connected between said control gear and said gear, a second axle rotatably carried at the end of said flap, a second flap connected to said second axle for rotation therewith, a second gear secured to said second axle, a stationary axle gear concentric with and secured to said first axle, and a second gear belt connected between said axle gear and the gear of said second axle, wherein said second gear belt has external gear teeth in meshing engagement with said stationary first axle gear, said gear belt further including internal gear teeth in meshing engagement with said second gear.

4. A transmission for the control of a flap in respect to a fixed air flow surface such as a wing, comprising an axle (3) adapted to be rotatably supported at the end of said wing and carrying said flap (2a), a gear (10) secured to said axle, a control gear (14) rotatably mounted on said wing, a gear belt (12) connected between said control gear and said gear, a second gear (11) secured to said axle for rotation therewith, a second axle (6) rotatably carried adjacent the outer end of said flap, a second flap (2b) connected to said second axle for rotation therewith, a third gear (16) secured to said second axle, a second gear belt (17) connected between said second and third gears, a fourth gear (18) secured to said second axle for rotation therewith, a third axle (7) carried adjacent the outer end of said flap, a fifth gear (20) secured to said third axle for rotation therewith, a third flap (2c) secured to said third axle for rotation therewith, a third gear belt (21) connected between said fourth and fifth gears, said third gear belt having internal gear teeth entrained to run in an uncrossed manner between said fourth and fifth gears, whereby to produce a movement of said third flap in a different rotative direction from said second flap.

References Cited in the file of this patent

UNITED STATES PATENTS

| 22,002 | Yerkes | Nov. 2, 1858 |
| 1,842,859 | Couzinet | Jan. 26, 1932 |
| 2,416,958 | Sears | Mar. 4, 1947 |
| 2,718,790 | Hughey | Sept. 27, 1955 |
| 2,960,285 | Lopez | Nov. 15, 1960 |

FOREIGN PATENTS

| 447,552 | Canada | Mar. 30, 1948 |
| 466,664 | Great Britain | June 2, 1937 |